United States Patent
Sado

(10) Patent No.: US 7,268,962 B2
(45) Date of Patent: Sep. 11, 2007

(54) METHOD AND APPARATUS FOR DETERMINING TRACK PITCH FOR WRITING SERVO INFORMATION IN A DISK DRIVE

(75) Inventor: Hideo Sado, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 211 days.

(21) Appl. No.: 10/946,646

(22) Filed: Sep. 22, 2004

(65) Prior Publication Data

US 2005/0068662 A1    Mar. 31, 2005

(30) Foreign Application Priority Data

Sep. 29, 2003    (JP) .............................. 2003-337749

(51) Int. Cl.
*G11B 27/36* (2006.01)
*G11B 21/02* (2006.01)

(52) U.S. Cl. .......................................... 360/31; 360/75
(58) Field of Classification Search ...................... None
See application file for complete search history.

(56) References Cited

U.S. PATENT DOCUMENTS

| | | | |
|---|---|---|---|
| 5,581,420 A | 12/1996 | Chainer et al. | |
| 6,101,064 A | 8/2000 | Shepherd | |
| 6,181,504 B1 | 1/2001 | Ahn | |
| 6,778,343 B2* | 8/2004 | Nunnelley | 360/31 |
| 6,885,514 B1* | 4/2005 | Codilian et al. | 360/31 |
| 2002/0176199 A1* | 11/2002 | Gomez et al. | 360/75 |
| 2003/0048561 A1 | 3/2003 | Kadokawa | |
| 2003/0210490 A1* | 11/2003 | Kim | 360/75 |
| 2003/0218821 A1 | 11/2003 | Sado | |
| 2005/0052767 A1* | 3/2005 | Miyata et al. | 360/31 |
| 2005/0068658 A1* | 3/2005 | Yamamoto | 360/75 |

FOREIGN PATENT DOCUMENTS

| | | |
|---|---|---|
| JP | 07-153213 | 6/1995 |
| JP | 2001-520430 | 10/2001 |
| JP | 2002-237142 | 8/2002 |
| JP | 2003-141835 | 5/2003 |
| JP | 2004171726 A * | 6/2004 |
| WO | WO 96/28814 | 9/1996 |
| WO | WO99/19866 | 4/1999 |
| WO | WO 02/065460 A1 | 8/2002 |

OTHER PUBLICATIONS

Austrian Search Report dated Apr. 22, 2005 for Singapore Appln. No. 200405090-2.
Chinese Office Action dated Apr. 7, 2006 for Appln. No. 200410011750.5.
Japanese Office Action dated May 15, 2007 for Appln. No. 2003-337749.

* cited by examiner

*Primary Examiner*—Andrea Wellington
*Assistant Examiner*—Dan I Davidson
(74) *Attorney, Agent, or Firm*—Pillsbury Winthrop Shaw Pittman, LLP

(57) ABSTRACT

A disk drive including a self-servo writing apparatus is disclosed. The self-servo writing apparatus calculates a pitch of servo tracks constituted on a disk medium by a calculation method using a positional error calculation value based on a reproduction amplitude value of a servo burst pattern signal reproduced by a head.

5 Claims, 6 Drawing Sheets

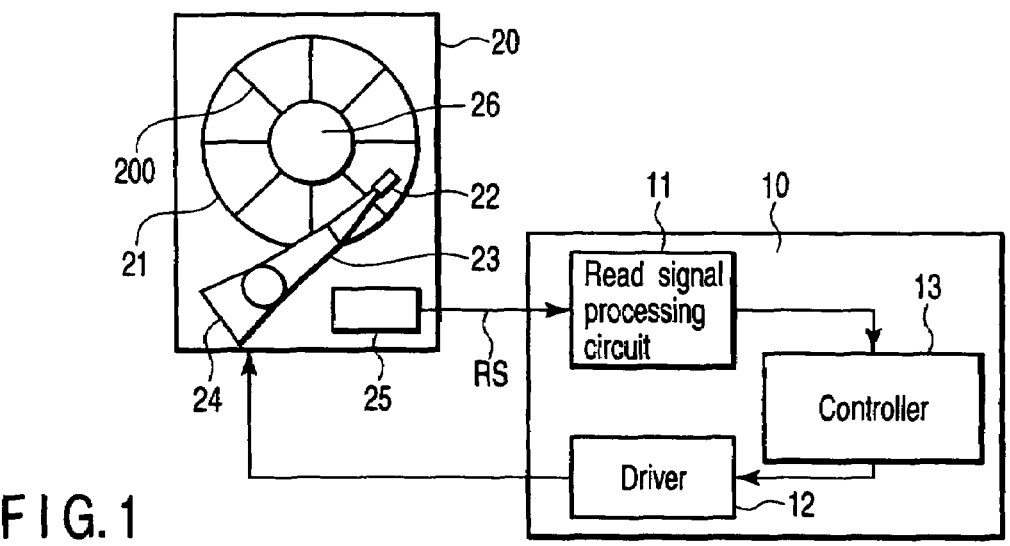
FIG. 1
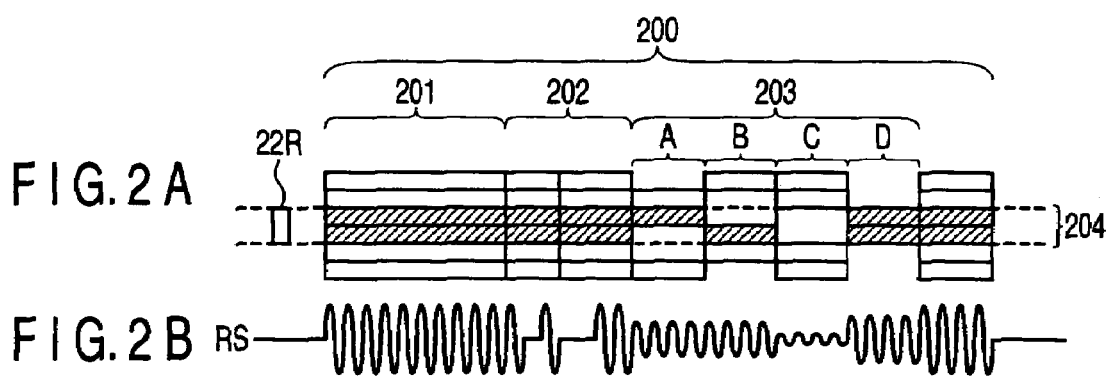
FIG. 2A
FIG. 2B
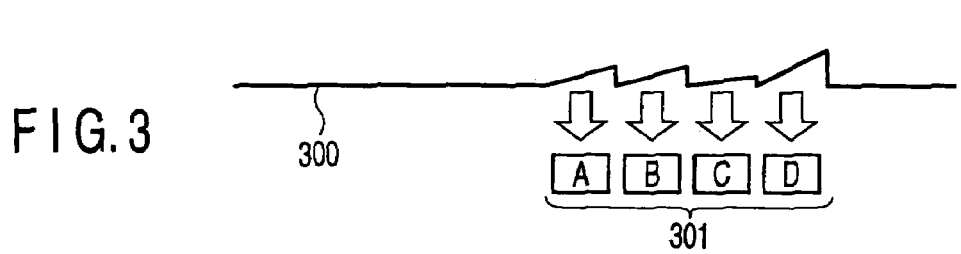
FIG. 3

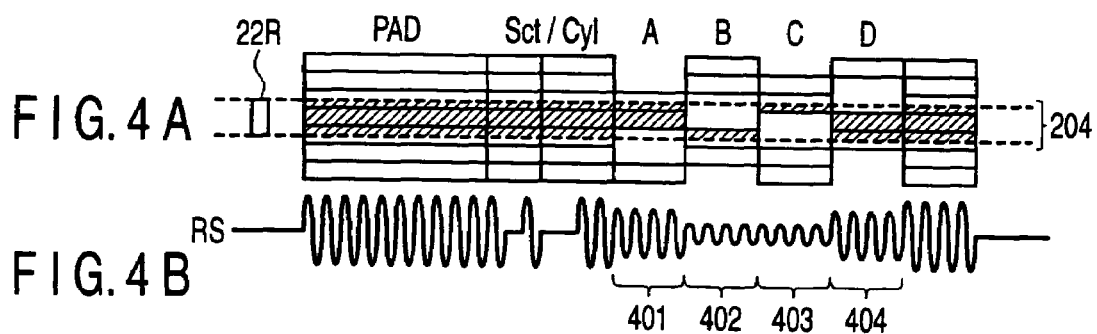
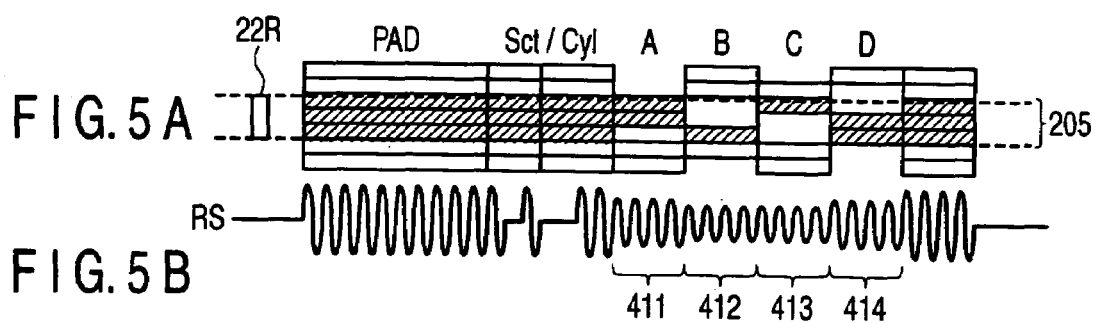
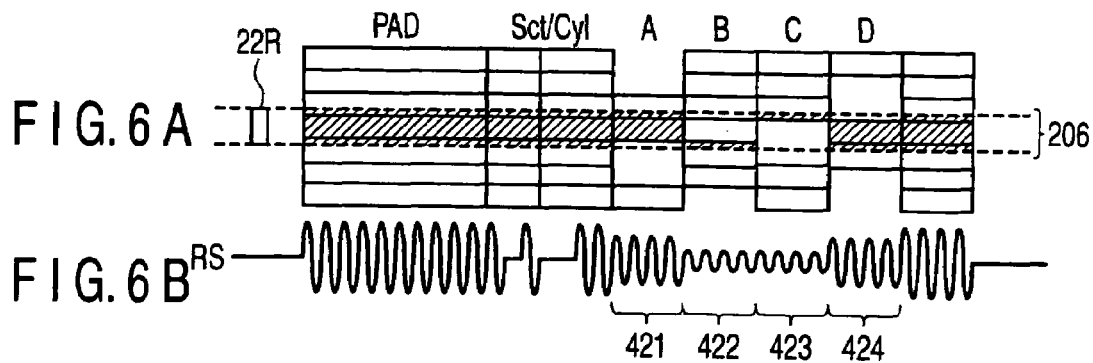

METHOD AND APPARATUS FOR DETERMINING TRACK PITCH FOR WRITING SERVO INFORMATION IN A DISK DRIVE

CROSS-REFERENCE TO RELATED APPLICATIONS

This application is based upon and claims the benefit of priority from the prior Japanese Patent Application No. 2003-337749, filed Sep. 29, 2003, the entire contents of which are incorporated herein by reference.

BACKGROUND OF THE INVENTION

1. Field of the Invention

The present invention generally relates to a disk drive, and more particularly to a technique which determines a track pitch for writing servo information on a disk medium.

2. Description of the Related Art

Generally, a disk medium on which servo information for head positioning is recorded in advance is incorporated in a disk drive as typified by a hard disk drive. The servo information is recorded by a servo track writer (STW) in a disk drive manufacturing step.

In a servo write step, there is a self-servo write mode by which servo information is recorded on a disk medium in a disk drive itself (e.g., see U.S. Pat. No. 5,581,420).

In the self-servo write mode, in order to determine a head feed pitch quantity when recording a servo pattern, processing for determining a servo track pitch is required. A method of determining a track pitch disclosed in a prior art reference determines a next track pitch by comparing intensities of reproduction amplitudes of servo burst patterns at the time of a write operation in a write-once-read-multiple mode.

However, a reproduction amplitude which is output from a head varies depending on a position of a head in a radial direction (radial position) which falls in an inner/outer peripheral range on a disk medium. As its factors, there can be considered a flying height of a head, a recording resolution of a disk medium, settings of a band filter of a servo decoder, an influence of an amplitude equalization filter and others. Therefore, the method of determining a servo track pitch by comparing reproduction amplitudes of servo burst patterns has a possibility that this track pitch varies depending on a radial position of a head.

In order to solve such a problem, there has been proposed a method which takes a fact that a servo signal reproduction output varies depending on a flying height or a radial position of a head into consideration and changes a reference value of a track pitch in accordance with each head or a zone (e.g., see U.S. Pat. No. 6,181,504).

However, this method disclosed in the reference presupposes that servo information is written on an entire surface of a disk medium, and it is not suitable for the self-servo write mode which determines a track pitch while writing servo information.

In the method disclosed in each prior art reference mentioned above, a measurement position which is required to determine a track pitch is defined as an intermediate point between a center of a servo burst pattern and a center of a servo burst pattern adjacent to the former pattern. Therefore, processing for moving a head to a specified position is required for the purpose of track pitch determination processing, and the servo writing processing efficiency is lowered in the self-servo write mode.

BRIEF SUMMARY OF THE INVENTION

In accordance with one embodiment of the present invention, there is provided a disk drive including facilities to determine track pitch without involving movement of a head to a specified position in self-servo writing processing.

The disk drive comprises: a head which reproduces a servo burst signal recorded on a disk medium; and a calculation unit which calculates a pitch of tracks constituted on the disk medium by utilizing a reproduction amplitude value of the servo burst signal which is output from the head.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a primary part of a disk drive concerning an embodiment according to the present invention;

FIGS. 2A and 2B are views showing a format and a read signal waveform of servo information concerning the embodiment;

FIG. 3 is a view showing a reproduction amplitude value of a servo burst pattern concerning the embodiment;

FIGS. 4A and 4B are views showing a track pitch and a reproduction amplitude value of a servo burst pattern concerning the embodiment;

FIGS. 5A and 5B are views showing a track pitch and a reproduction amplitude value of a servo burst pattern signal concerning the embodiment;

FIGS. 6A and 6B are views showing a track pitch and a reproduction amplitude value of a servo burst pattern concerning the embodiment;

DETAILED DESCRIPTION OF THE INVENTION

Figure 7A:
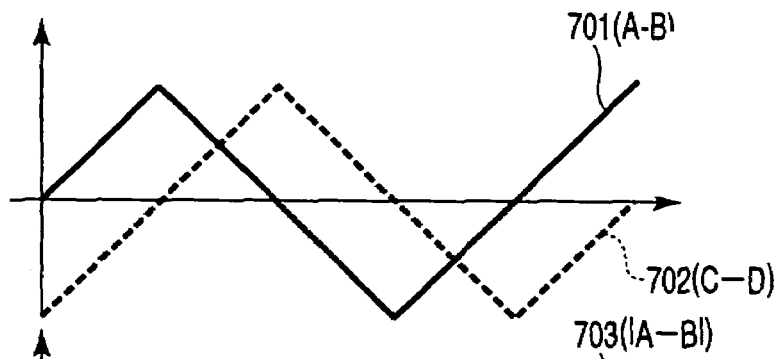
FIGS. 7A to 7C are views showing a relationship between a head position and a positional error value concerning the embodiment.

An embodiment according to the present invention will now be described hereinafter with reference to the accompanying drawings.

(Disk Drive and Servo Writer)

FIG. 1 is a block diagram showing a primary part of a disk drive concerning this embodiment.

A disk drive 20 has a disk medium 21 attached to a spindle motor 26, and a head 22 mounted on an actuator 23. The disk medium 21 is rotated at a high speed by the spindle motor 26.

The actuator 23 moves the head 22 in a radial direction on the disk medium 21 by a driving force of a voice coil motor (VCM) 24. The head 22 includes a read head which reads recording data (servo information in this example) from the disk medium 21, and a write head which writes data (servo information in this example) onto the disk medium 21.

In this embodiment, a circuit board 10 which realizes a self-servo write function is incorporated in the disk drive 20. This circuit board 10 will be referred to as a servo writer hereinafter for the sake of convenience. The circuit board 10 is used in order to realize a regular head positioning control function while being incorporated in the disk drive 20 after completion of the self-servo write processing.

The servo writer 10 has a read signal processing circuit (read channel) 11, a VCM driver 12 and a controller 13. The read channel 11 inputs a servo pattern signal (RS) read by the read head of the head 22 through a head amplifier IC 25. The read channel 11 reproduces servo information including a cylinder code and a servo burst pattern (A to D) from the servo pattern signal which is output from the head amplifier IC 25.

The controller 13 includes a microprocessor (CPU) or a DSP (digital signal processor) and memories such as an RAM or an ROM, and executes the servo write processing. The controller 13 operates as a main control device of the disk drive 20 after completion of the self-servo write processing.

The VCM driver 12 controls the VCM 24 to be driven in accordance with a current command value (control current value) which is output from the controller 13. As a result, the actuator 23 moves in the radial direction on the disk medium 21.

(Self-Servo Write Operation)

In the self-servo write mode, a reference servo pattern is previously recorded on the disk medium 21 which is incorporated in the disk drive 20. The servo writer 10 detects a radial position of the head 22 by using this reference servo pattern read by the read head on an initial stage.

In the servo writer 10, the read channel 11 reproduces a cylinder code and a servo burst pattern from a reference servo pattern signal (RS) which is read by the read head. The controller 13 executes a positioning control calculation of the head 22 by using the servo burst pattern (A to D), thereby generates a current command value which is used to control the VCM 24 to be driven, and supplies it to the VCM driver 12.

With the above-described operation, the servo writer 10 records the servo pattern signal on the disk medium 21 while positioning the head 22 in the radial direction. Here, the reference servo pattern is generally recorded on the inner peripheral side of the disk medium 21.

Therefore, the servo writer 10 executes the servo information write operation while moving the head 22 with a feed pitch quantity which is ½ or ⅓ of an actual servo track pitch in an outer peripheral side direction from the inner peripheral side on the disk medium 21. As a result, servo areas 200 in which the servo information is recorded are constituted at fixed intervals on the disk medium 21 as shown in FIG. 1.

FIG. 2A is a view showing a format of the servo information recorded on the disk medium 21.

The servo information 200 includes a preamble signal (PAD) 201, address codes 202 of a sector and a cylinder (track), and a servo burst pattern signal (A to D) 203. The servo burst pattern signal (A to D) 203 is an amplitude detection type servo signal, and it is a multiphase burst signal with which magnetization reversals are recorded at equal intervals.

Here, the read head 22R included in the head 22 reads the servo pattern signal 200 from an area 204 through which the head 22R passes. The head amplifier IC 25 amplifies an output signal of the read head 22R, and outputs a reproduction signal RS having such a waveform as shown in FIG. 2B to the read channel 11.

As shown in FIG. 3, the read channel 11 detects a reproduction amplitude value 300 corresponding to each of a burst signal A to a burst signal D included in the servo burst pattern signal 203, acquires it as a positional error signal (A to D) having a digital value, and stores it in a register 301.

Specifically, the read channel 11 converts the reproduction signal RS into a digital value by using an analog-to-digital (A/D) converter, detects as a reproduction amplitude value (A to D) of the servo burst pattern signal 203 an integration value 300 obtained by integrating the converted signals in accordance with each phase (A to D), and stores it in the register 301.

(Servo Track Pitch Determination Method)

As described above, the servo writer 10 executes a positioning control of the head 22 by using the reference servo pattern on the initial stage in the self-servo write operation, and sequentially records a next servo pattern signal by using the servo burst pattern signal 203 of the previously recorded servo pattern signal 200.

At this time, the servo writer 10 according to this embodiment executes track pitch determination processing which determines a servo track pitch required to subsequently move the head 22 by using the previously recorded servo burst pattern signal 203. This method will now be described concretely.

FIGS. 4A to 6B are views showing a relationship between track pitches (204 to 206) and reproduction amplitude values of the servo burst pattern signals.

As shown in FIGS. 4A and 4B, when the read head 22R passes through an area of a track pitch 204, amplitude values of the respective reproduction signals RS corresponding to the burst signal A 401 and the burst signal D 404 become equal to each other. Likewise, amplitude values of the respective reproduction signals RS corresponding to the burst signal B 402 and the burst signal C 403 become equal to each other.

FIG. 5A is a view showing a state when the read head 22R passes through an area of a track pitch 205 narrower than the track pitch 204 depicted in FIG. 4A. FIG. 5B shows an amplitude value of the reproduction signal RS of the servo burst pattern signal at this moment. In this case, although amplitude values of the respective reproduction signals corresponding to the burst signal A 411 and the burst signal D 414 become equal to each other, they are small as compared with the example shown in FIG. 4B. Conveniently, amplitude values of the respective reproduction signals corresponding to the burst signal B 412 and the burst signal C 413 become larger than those in the example shown in FIG. 4B.

FIG. 6A is a view showing a state when the read head 22R passes through an area of a track pitch 206 wider than the track pitch 204 depicted in FIG. 4A. FIG. 6B shows an amplitude value of the reproduction signal RS of the servo burst pattern signal at this time. In this case, amplitude values of the respective reproduction signals corresponding to the burst signal A 421 and the burst signal D 424 become larger than those in the example shown in FIG. 4B. On the contrary, amplitude values of the respective reproduction signals corresponding to the burst signal B 422 and the burst signal C 423 become smaller than those in the example depicted in FIG. 4B.

Based on the above-described relationship, the controller 13 of the servo writer 10 calculates a first positional error calculation result "absolute value of A-B" and a second positional error calculation result "absolute value C-D" using the respective reproduction amplitude values (A to D) when the servo burst pattern signal is read, thereby calculating a track pitch.

In other words, it can be confirmed that intensities of the first and second positional error calculation values (absolute values) vary in accordance with the wideness of the track pitch. It is to be noted that the respective reproduction amplitude values (A to D) are stored in the register 301 as shown in FIG. 3.

Specifically, when the track pitch is relatively narrow, the first positional error calculation result "absolute value of A-B" and the second positional error calculation result "absolute value of C-D" become relatively small values. Further, when the track pitch is relatively wide, the first positional error calculation result "absolute value of A-B" and the second positional error calculation result "absolute value of C-D" become relatively large values.

Figure 7B:
Figure 7C:
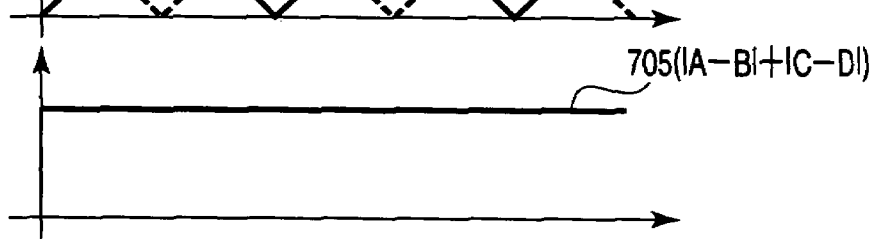

FIGS. 7A to 7C are figures showing a relationship between head positions and positional error calculation values, in which the horizontal axis represents head positions and the vertical axis represent amplitude values.

As shown in FIGS. 7A to 7C, the first positional error calculation value 701 (A-B) using the reproduction amplitude values A and B linearly varies with respect to movement of the head 22 in the radial direction. Furthermore, the second positional error calculation value 702 (C-D) using the reproduction amplitude values C and D linearly varies with a different phase.

FIG. 7B is a view showing a linear change when respective absolute values 703 and 704 of the first positional error calculation value 701 (A-B) and the second positional error calculation value 702 (C-D) are obtained.

Moreover, FIG. 7C is a view when a sum total 705 of the respective absolute values 703 and 704 is obtained. As shown in FIGS. 4A, 5A and 6A, intensities of the respective absolute values vary depending on the track pitch. Therefore, the controller 13 of the servo writer 10 can calculate the track pitch from the sum total (average) of the respective absolute values 703 and 704 of the first positional error calculation value 701 (A-B) and the second positional error calculation value 702 (C-D) irrespective of the off-track position of the head 22.

Figure 8:
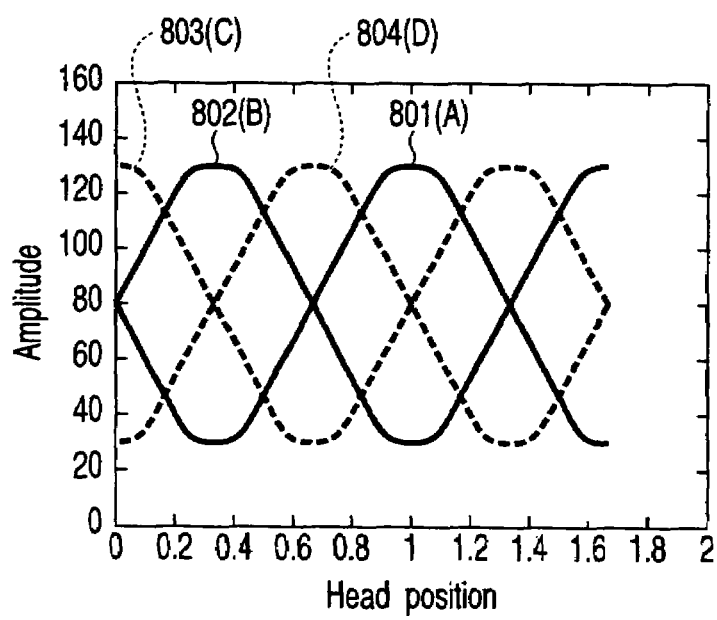
FIG. 8 is a view showing reproduction characteristics of a servo burst pattern signal concerning the embodiment.

FIG. 8 shows a measurement result of the respective servo burst signals 801 (A) to 804 (D) when a position of the read head 22R in the radial direction is changed. This measurement result corresponds to a reproduction amplitude value which is stored in the register 301 mentioned above.

The measurement result shown in FIG. 8 has a waveform in which an apex of a triangular waveform is collapsed as compared with the example depicted in FIG. 7. When a head width of the read head 22R is not equal to a width of the servo burst pattern, it is often the case that the reproduction amplitude of the servo burst pattern signal has a dead band area with respect to the head position. When such a reproduction signal is obtained, it is preferable to consider the waveform as a trapezoidal waveform or a sinusoidal waveform rather than the triangular waveform.

(Track Pitch Calculation Method)

Based on the principle of the servo track pitch determination method mentioned above, the concrete calculation method will now be described with reference to expressions.

First, as shown in FIG. 7, in reproduction characteristics when the read head 22R reproduces the servo burst pattern signal, when there are no saturation characteristics, a track pitch Tp is calculated based on the following Expression (1) or Expression (2).

$$T_p = K(|A - B| + |C - D|) \quad (1)$$

$$T_p = K\left(\frac{|A - B| + |C - D|}{2}\right) \quad (2)$$

Here, K is a coefficient, and it is desirable that K is an accommodation coefficient which is dependent on a radial position of the head 22.

Additionally, as shown in FIG. 8, when there are the saturation characteristics like an example in which the reproduction characteristics can be dealt as a sinusoidal waveform, the track pitch Tp can be calculated based on the following Expression (3) or Expression (4).

$$T_p = K\frac{(A - B)^2 + (C - D)^2}{2} \quad (3)$$

$$T_p = K\sqrt{\frac{(A - B)^2 + (C - D)^2}{2}} \quad (4)$$

That is, in place of the absolute value calculation shown in Expressions (1) and (2) mentioned above, as shown in Expression (3), an average (or a sum total) of square calculation results of the respective positional error calculation values (A-B and C-D) is calculated. Further, in order to make the track pitch calculation value linear, a square root calculation is carried out with respect to the average value of the added values as shown in Expression (4) mentioned above, thereby enabling linear estimation of the track pitch. Here, as a modification of Expression (4), it is possible to adopt a calculation method by which a square root calculation is carried out with respect to a sum total of the square calculation results of the respective positional error calculation values (A-B and C-D).

Figure 9:
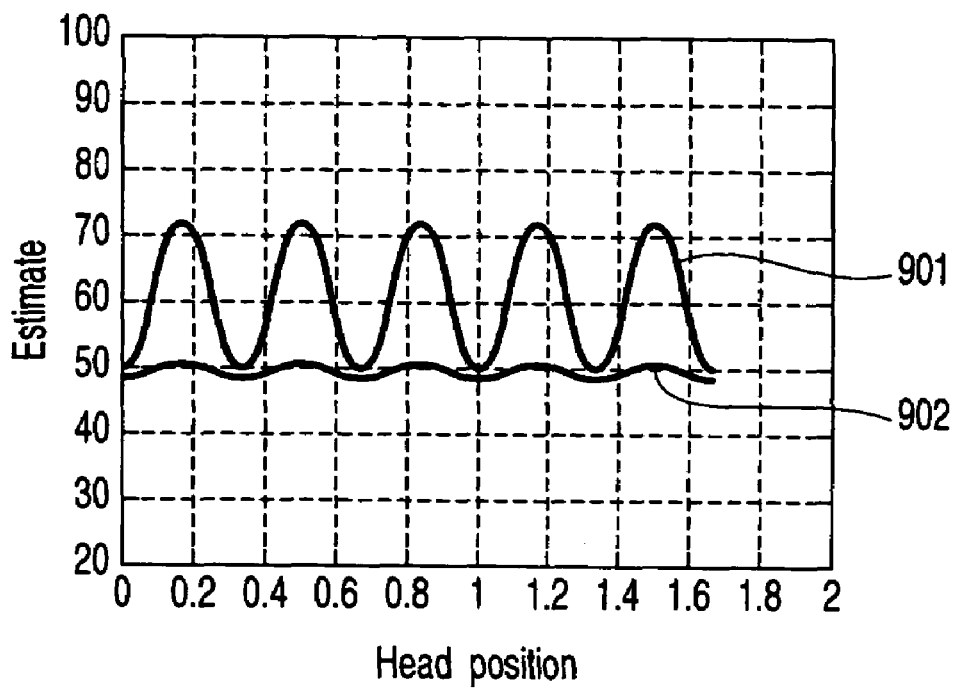
FIG. 9 is a view showing estimates of a track pitch with respect to head positions concerning the embodiment.

FIG. 9 is a view showing estimation results of a track pitch with respect to a head position. An estimation result 902 calculated based on Expression (3) is shown with respect to an estimation result 901 calculated based on Expression (1).

That is, when the reproduction characteristics having such saturation characteristics as shown in FIG. 8 are demonstrated, an estimate of the servo track pitch which is not dependent on an off-track position of the head 22 can be obtained by calculating a square sum average.

Figure 10:
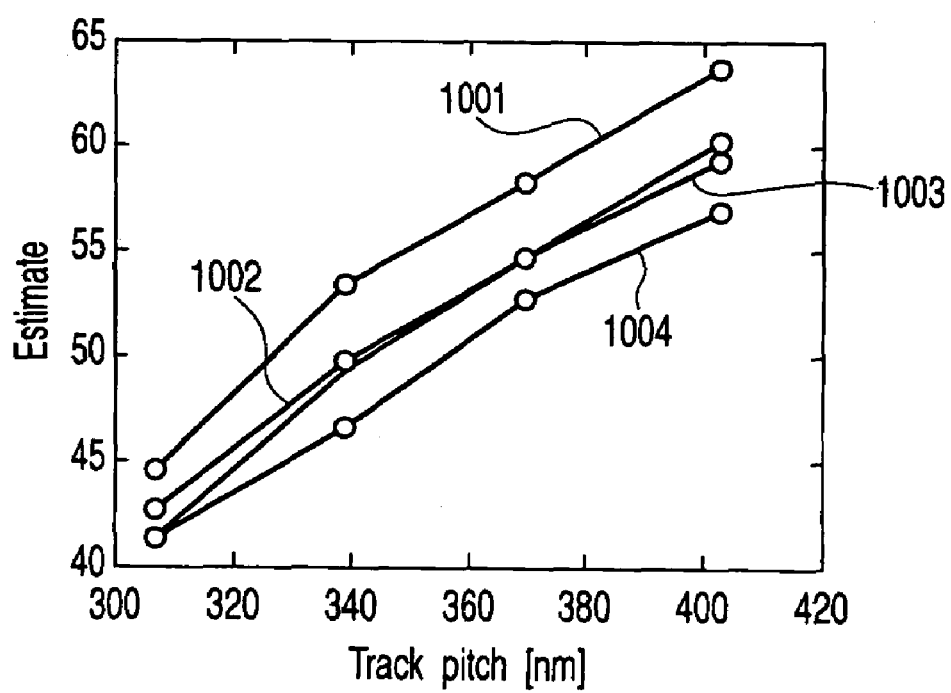
FIG. 10 is a view showing a relationship between changes in track pitch and estimates concerning the embodiment.

FIG. 10 shows an estimate of the track pitch when the servo track pitch represented by a horizontal axis is changed. This estimate can be calculated by a square root calculation with respect to an average of a square sum shown in Expression (4).

In FIG. 10, reference numeral 1001 denotes a track on the inner peripheral side; reference numeral 1004, a track on the outer peripheral side; and reference numerals 1002 and 1003, tracks on an intermediate peripheral side. As shown in FIG. 10, when the calculation method based on Expression (4) is adopted, it can be confirmed that linear estimation can be effected with respect to a change in the track pitch. Furthermore, an estimate of the track pitch varies depending on a head position on the inner peripheral side, the intermediate peripheral side and the outer peripheral side.

(Coefficient K Determination Method)

Figure 11:
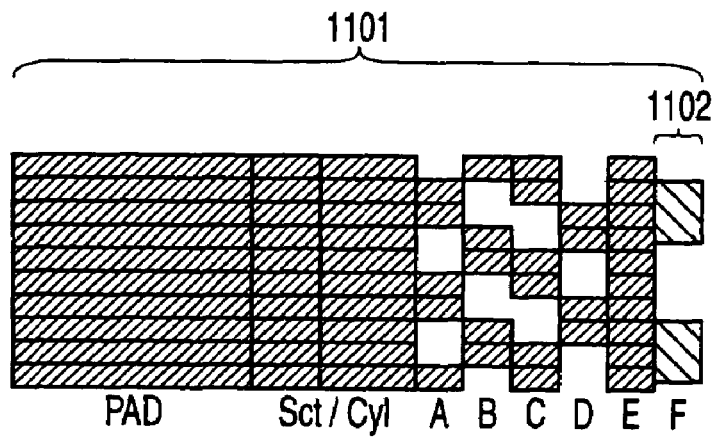
FIG. 11 is a view showing a servo pattern which relates to a coefficient K determination method concerning the embodiment.

FIG. 11 shows a servo pattern 1101 which concerns a determination method of the coefficient K used in Expression (1) to Expression (4). This determination method is a method which determines the coefficient K which is required to detect an estimate of the track pitch without being dependent on a head position.

The servo pattern 1101 shown in FIG. 11 has a structure in which a servo burst pattern (F) 1102 which is not trimmed is added to the regular servo burst patterns A to D. It is to be noted that the pattern E means a post-preamble. The servo burst pattern (F) 1102 has a pattern width corresponding to a magnetic recording width (1300 in FIG. 13) of the write head included in the head 22.

Figure 12A:
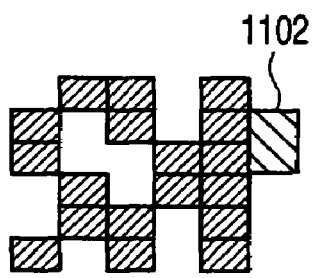
FIGS. 12A to 12C are views showing a relationship between servo burst patterns and track pitches in the determination method.
Figure 12B:
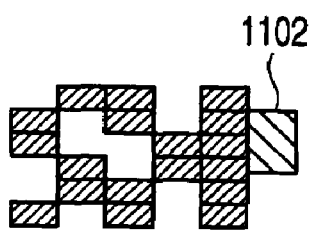
Figure 12C:
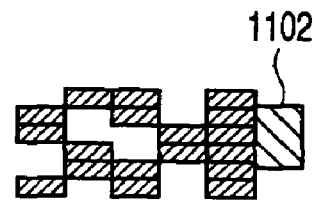

FIGS. 12A to 12C are views showing a relationship between untrimmed servo burst patterns 1102 and track pitches.

FIG. 12A shows a track pitch when a magnetic recording width (which will be referred to as an MWW) of the pattern 1102 is relatively narrow (MWW=1.9). FIG. 12C shows a track pitch when the pattern 1102 is relatively wide (MWW=3.3). FIG. 12B shows a track pitch when the pattern 1102 has a wideness between the above-described values (MWW=2.5).

As shown in FIGS. 12A to 12C, it can be confirmed that the number of tracks per magnetic recording width (MWW) of the untrimmed servo burst pattern 1102 varies when the track pitch changes. In other words, by measuring a width of the untrimmed servo burst pattern 1102 with the number of tracks being determined as a unit (base), the track pitch can be measured.

Figure 13:
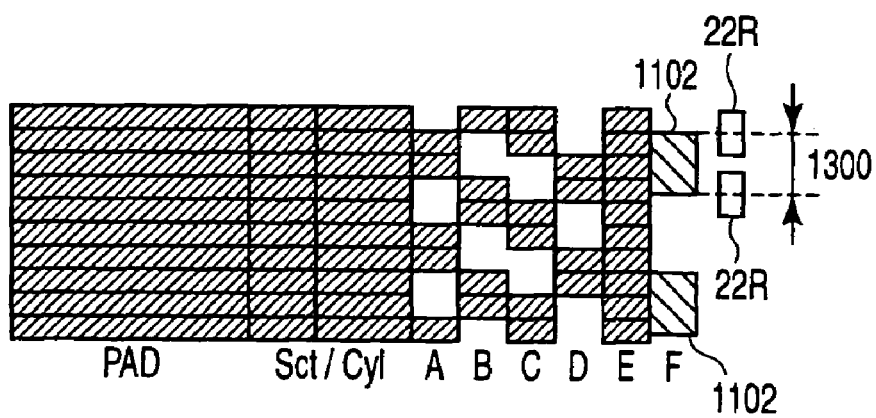
FIG. 13 is a view showing a servo burst pattern width measurement method concerning the embodiment.

FIG. 13 is a view illustrating a method of measuring a magnetic recording width 1300 of the untrimmed servo burst pattern 1102.

First, the read head 22R is moved onto a border of the pattern 1102, and a position of the read head 22R at that moment is calculated based on the servo burst patterns A to D, thereby measuring the magnetic recording width 1300 of this pattern 1102.

Such a conversion factor (ratio) as shown in the following Expression (5) can be obtained by using an estimate (Tpw) of the track pitch utilizing the magnetic recording width 1300 of such a pattern 1102 and an estimate (TpR) of the track pitch calculated based on, e.g., Expression (4).

$$K = \frac{T_{pW}}{T_{pR}} \tag{5}$$

Since an estimation error is actually generated due to noises or the like, it is preferable to obtain an average value with respect to conversion factors calculated at a plurality of positions. Moreover, the conversion factor may be obtained by such a sequential average calculation as shown in the following Expression 6) using a weighting factor λ in place of the average value.

$$\overline{K}(n+1) = \lambda K + (1-\lambda)\overline{K}(n) \tag{6}$$

It is to be noted that the present invention can be likewise realized by holding the coefficient K as a table when the table can be looked up in accordance with a radial position of the head.

Figure 14A:
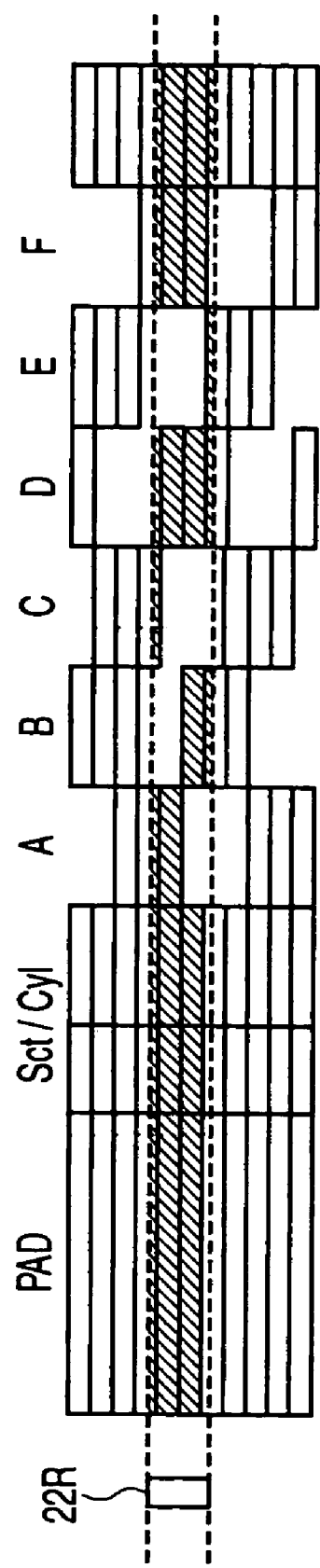
FIGS. 14A and 14B are views showing a format and a read signal waveform of a six-phase servo burst pattern signal concerning the embodiment.
Figure 14B:
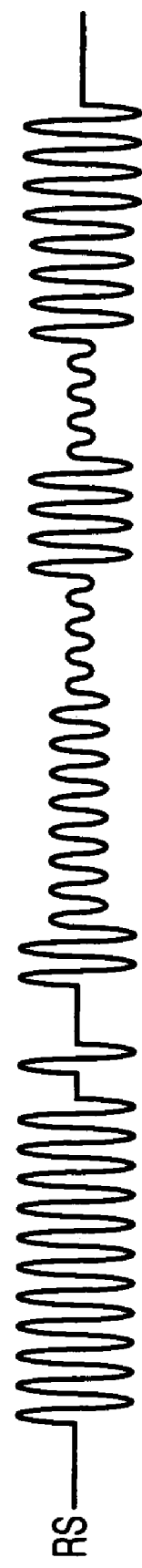

FIG. 14A shows servo burst patterns (A to F) in a six-phase servo mode. FIG. 14B is a view showing waveforms of the reproduction signals RS of the servo burst patterns (A to F).

When the six-phase servo burst can be divided into three sets of servo bursts, the track pitch can be calculated based on the following Expression (7) which is the same as the calculation method represented by Expression (4).

$$T_P = K\sqrt{\frac{(A-B)^2 + (C-D)^2 + (E-F)^2}{3}} \tag{7}$$

That is, by effecting a square root calculation with respect to a sum total of square calculation results of the respective positional error calculation values (A-B, C-D, E-F), linear estimation of the track pitch becomes possible.

As described above, according to this embodiment, a pitch of the servo tracks can be calculated (estimated) by the calculation processing of the controller 13 by using the servo burst patterns recorded on the disk medium 21 without moving the head 22 to a specific position.

In other words, the servo track pitch can be determined without being dependent on a radial position of the head 22 on the disk medium 21. Therefore, the controller 13 can execute the self-servo write operation which sequential records the servo information on the disk medium while adjusting a feed quantity of the head 22 based on the track pitch. That is, a feed pitch quantity of the head which is required to record the servo information can be efficiently set by determining the servo track pitch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A disk drive comprising:

a head which reproduces servo burst signals recorded on a disk medium; and a calculation unit which calculates a pitch of tracks constituted on the disk medium by utilizing a reproduction amplitude value of the servo burst signals which are output from the head, wherein the servo burst signals include respective servo burst signals which are a first set required to detect a first head position in a range of the tracks, and respective servo burst signals which are a second set required to detect a second head position in the range of the tracks, the second set not including the burst signals of the first set, the calculation unit calculates a pitch of the tracks by using a first reproduction amplitude value difference of the respective servo burst signals which are the first set and a second reproduction amplitude value difference of the respective servo burst signals which are the second set, and the calculation unit calculates a sum total of respective absolute values of the first and second reproduction amplitude value differences as the pitch of the tracks.

2. A disk drive, comprising:

a head configured to reproduce servo burst signals recorded on a disk medium; and a calculation unit configured to calculate a pitch of tracks constituted on the disk medium by utilizing a reproduction amplitude value of the servo burst signals that are output from the head, wherein, the servo burst signals include a first set of servo burst signals for detecting a first head position in a range of the tracks, and a second set of servo burst signals for detecting a second head position in the range of the tracks, and wherein, the calculation unit calculates a first reproduction amplitude value difference based on the first set of servo burst signals and a second reproduction amplitude value difference based on the second set of servo burst signals, and calculates an average value of sum totals of respective absolute values of the first and second reproduction amplitude value differences as the pitch of the tracks.

3. A disk drive comprising:

a head configured to reproduce servo burst signals recorded on a disk medium; and a calculation unit configured to calculate a pitch of tracks constituted on the disk medium by utilizing a reproduction amplitude value of the servo burst signals that are output from the head, wherein, the servo burst signals include a first set of servo burst signals for detecting a first head position in a range of the tracks, and a second set of servo burst signals for detecting a second head position in the range of the tracks, and wherein, the calculation unit calculates a first reproduction amplitude value difference based on the first set of servo burst signals and a second reproduction amplitude value difference based on the second set of servo burst signals, and calculates a square root of a sum total of respective squares of the first and second reproduction amplitude value differences as the pitch of the tracks.

4. A disk drive, comprising:

a head configured to reproduce servo burst signals recorded on a disk medium; and a calculation unit configured to calculate a pitch of tracks constituted on the disk medium by utilizing a reproduction amplitude value of the servo burst signals that are output from the head, wherein, the servo burst signals include a first set of servo burst signals for detecting a first head position in a range of the tracks, and a second set of servo burst signals for detecting a second head position in the range of the tracks, and wherein, the calculation unit calculates a first reproduction amplitude value difference based on the first set of servo burst signals and a second reproduction amplitude value difference based on the second set of servo burst signals, and calculates a square root of an average value of sum totals of respective squares of the first and second reproduction amplitude value differences as the pitch of the tracks.

5. A disk drive comprising:

a head configured to reproduce servo burst signals recorded on a disk medium; and a calculation unit configured to calculate a pitch of tracks constituted on the disk medium by utilizing a reproduction amplitude value of the servo burst signals that are output from the head, wherein, the calculation unit uses a coefficient which is set based on a magnetic recording width of a write head element included in the head.

* * * * *